(12) United States Patent
Marcovecchio et al.

(10) Patent No.: US 10,474,805 B2
(45) Date of Patent: Nov. 12, 2019

(54) METHODS AND DEVICES FOR ACCESSING PROTECTED APPLICATIONS

(71) Applicant: BlackBerry Limited, Waterloo (CA)

(72) Inventors: Vincenzo Kazimierz Marcovecchio, Mississauga (CA); Joseph Patrick Kirwin, Vancouver (CA)

(73) Assignee: BlackBerry Limited, Waterloo, Ontario (CA)

( * ) Notice: Subject to any disclaimer, the term of this patent is extended or adjusted under 35 U.S.C. 154(b) by 163 days.

(21) Appl. No.: 15/679,511

(22) Filed: Aug. 17, 2017

(65) Prior Publication Data
US 2019/0057204 A1 Feb. 21, 2019

(51) Int. Cl.
G06F 21/33 (2013.01)
G06F 21/62 (2013.01)
H04L 29/06 (2006.01)
H04L 29/08 (2006.01)
G06F 21/10 (2013.01)
(Continued)

(52) U.S. Cl.
CPC ............ G06F 21/335 (2013.01); G06F 21/62 (2013.01); H04L 63/08 (2013.01); H04L 63/0807 (2013.01); H04L 63/1433 (2013.01); H04L 67/146 (2013.01); G06F 21/10 (2013.01); G06F 21/577 (2013.01); H04L 9/3213 (2013.01);
(Continued)

(58) Field of Classification Search
CPC ........ G06F 21/335; G06F 21/62; G06F 21/10; G06F 21/577; H04L 63/08; H04L 63/0807; H04L 63/1433; H04L 67/146; H04L 9/3213; H04L 63/0884; H04L 63/108; H04L 67/02

USPC ............................................................ 726/5
See application file for complete search history.

(56) References Cited

U.S. PATENT DOCUMENTS 7,924,709 B2 * 4/2011 Lynn ....................... G06F 21/00
370/230
8,132,235 B2 * 3/2012 Bussani .............. H04L 63/0853
709/223
(Continued)

FOREIGN PATENT DOCUMENTS

EP 2410452 1/2012
WO WO-2012000801 A1 * 1/2012 ......... G06F 21/6218

OTHER PUBLICATIONS

Epo, Extended European Search Report, relating to application No. 18188328.1, dated Dec. 11, 2018.

*Primary Examiner* — Taghi T Arani
*Assistant Examiner* — Badridot Champakesanatusptodotgov
(74) *Attorney, Agent, or Firm* — Rowand LLP

(57) ABSTRACT

Methods and devices for accessing protected applications. A client device accessing a protected application executing on the application server is provided. The client device configured to establish a session between the client device and the application server based on an exchange of authentication credential information between the client device and the application server; generate an authentication token from the authentication credential information associated with the protected application; transfer the authentication token to the remote server for storage at the remote server; and transmit a directive to the remote server to access the protected application executing on the application server, where the directive includes an identifier associated with the authentication token for accessing the protected application.

18 Claims, 5 Drawing Sheets

(51) Int. Cl.
*H04L 9/32* (2006.01)
*G06F 21/57* (2013.01)

(52) U.S. Cl.
CPC ........ *H04L 63/0884* (2013.01); *H04L 63/108* (2013.01); *H04L 67/02* (2013.01)

(56) References Cited

U.S. PATENT DOCUMENTS

| | | | | |
|---|---|---|---|---|
| 8,132,242 | B1* | 3/2012 | Wu | H04L 63/0884 713/168 |
| 8,595,803 | B2* | 11/2013 | Zaitsev | G06F 21/56 726/4 |
| 8,719,572 | B2* | 5/2014 | Schertzinger | G06F 21/33 713/170 |
| 8,904,510 | B2* | 12/2014 | Ho | H04L 63/168 726/9 |
| 9,077,745 | B1* | 7/2015 | Kline | H04L 63/1433 |
| 9,276,933 | B2* | 3/2016 | Sng | H04L 63/0884 |
| 2005/0132232 | A1* | 6/2005 | Sima | G06F 21/577 726/4 |
| 2006/0048214 | A1* | 3/2006 | Pennington | H04L 63/10 726/5 |
| 2015/0180868 | A1* | 6/2015 | Sng | H04L 63/0884 726/9 |
| 2016/0057154 | A1* | 2/2016 | Ferguson | H04L 63/104 726/7 |
| 2018/0211055 | A1* | 7/2018 | Balijepalli | H04L 9/0819 |

* cited by examiner

METHODS AND DEVICES FOR ACCESSING PROTECTED APPLICATIONS

FIELD

The present application generally relates to methods and systems for application testing and, in particular, to testing a protected application.

BACKGROUND

Modern application programs are designed to perform a group of coordinated functions, tasks, or activities and often include functionality responsive to input and output. Application developers utilize testing tools designed to coordinate organized sequence of interactions with applications-under-test to identify deficiencies in the applications or differences from expected behavior. For example, penetration testers often use web application testing tools to scan web applications for deficiencies, such as broken website links, security vulnerabilities, or other unexpected or undesirable behavior.

As modern application programs are designed with more user customizable features, many of the features may be implemented behind authentication walls. To test specific features of modern applications, application test tools or suites must be provided with user credentials for accessing non-publicly accessible portions of application programs.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
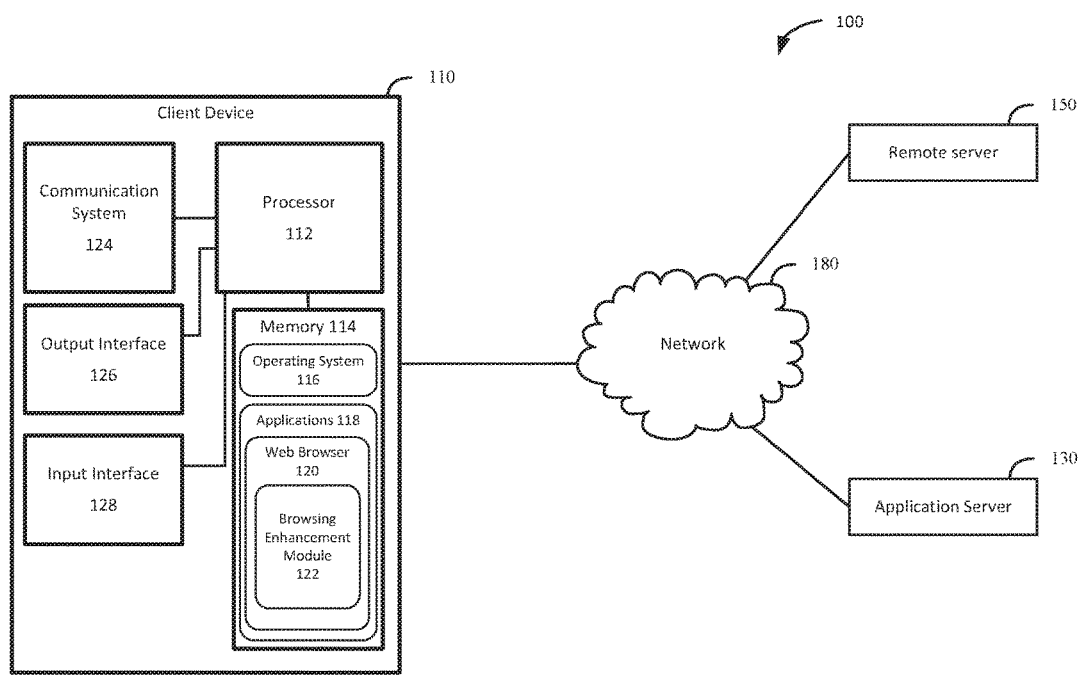
FIG. 1 illustrates a block diagram illustrating an operating environment in which example embodiments of the present disclosure may be applied.

In a first aspect, the present application describes a method of accessing a protected application executing on an application server. The method includes establishing a session between a client device and the application server based on an exchange of authentication credential information between the client device and the application server; generating an authentication token from the authentication credential information associated with the protected application; transferring the authentication token to the remote server for storage at the remote server; and transmitting a directive to the remote server to access the protected application executing on the application server, where the directive includes an identifier associated with the authentication token for accessing the protected application.

In another aspect, the present application describes a client device accessing a protected application executing on an application server. The client device includes a processor; a communication system coupled to the processor for communicating over a network with the remote server and the application server; and a memory coupled to the processor and storing processor-readable instructions. When executed, the instructions cause the processor to establish a session between the client device and the application server based on an exchange of authentication credential information between the client device and the application server; generate an authentication token from the authentication credential information associated with the protected application; transfer the authentication token to the remote server for storage at the remote server; and transmit a directive to the remote server to access the protected application executing on the application server, where the directive includes an identifier associated with the authentication token for accessing the protected application.

In yet a further aspect, the present application describes non-transitory processor-readable medium storing processor-readable instructions which, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

Many of the example embodiments described herein relate to accessing protected web applications and testing web applications. Examples of web applications may include web electronic mail platforms, online retail sales platforms, online auction platforms, or instant messaging services. Web applications are often intended to be accessed via a network connection or via a web browser. It will be understood that some aspects of the present application are not limited to web applications and may be applied to other software applications in which a client device may run in an environment other than a web browser.

Non-web applications may include applications that are executable on a computing device and may be designed for offline use. For example, non-web applications may rely on its own software protocols for program execution and user interface. Accordingly, the present application is not limited to authenticated access to protected web applications, but may be applied to authenticated access to protected non-web applications.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern application programs are designed to perform a group of coordinated functions, tasks, or activities and often include functionality responsive to input and output. Publicly accessible Internet webpages, for example, may be designed for providing information to a user. An Internet web page may include "clickable" user interface elements allowing a user to navigate the web page for information. Penetration testers often utilize tools to scan web applications for deficiencies, such as broken website links, or other unexpected or undesirable behaviour. Testing using such tools may be sufficient if the Internet web page is publicly accessible.

As modern application programs are designed with user customizable and personalized features, many of the features may be implemented behind authentication walls. For example, authentication walls may include a login user interface, requiring receipt of username and password credentials before allowing access to the application program. Accordingly, tools that penetration testers often use may be sufficient for publicly-accessible portions of the application, but may not be sufficient to perform scans or tests on functionality that may be protected by an authentication wall. In order to perform in-depth scans and tests of protected applications requiring authenticated access, the tools may be provided with authentication credential information to emulate the behavior of a logged-in user. For example, the tools may be provided with credential information, such as usernames and associated passwords, biometric data, gesture data, location data, authentication keys, or other authentication information. The credential information may be unencrypted and may be utilized by any party having knowledge of the credentials. However, it may not be desirable to provide third party applications or suites with such authentication credential information. Authentication credential information may be easily distributed, and unless the authentication credential information is overridden at the credential issuer's database, it may be challenging to control the use or dissemination of authentication credential information.

In some embodiments, prior to executing test tools or suites, such tools or suites may require extensive installation or configuration on a computing device. The installation and configuration of test tools or suites may, in some examples, be laborious and time consuming Further, operation of the test tools or suites may consume processor resources on a penetration tester's computing device. When an application-under-test is executing on an application server located behind a firewall, test tools or suites may need to be provided with access to an available firewall port for communicating with the application server. Accordingly, it may be advantageous to provide a remote or dedicated computing device for executing test tools or suites, and to configure the remote computing device for performing tests on behalf of the penetration tester's computing device. In some embodiments, it may be useful for providing a remote or dedicated computing device that need not communicate with the application server through a firewall or firewall port.

Reference is now made to FIG. 1, which illustrates a block diagram of a system 100 in which embodiments of the present application may operate. The system 100 includes a client device 110, an application server 130, and a remote server 150. The client device 110, the application server 130, and the remote server 150 may be configured to communicate over one or more networks 180, which may include public networks (e.g., the Internet), private networks, VPNs, wired networks, wireless networks, and combinations thereof. The application server 130 and the remote server 150 may be implemented using one or more computing devices having processing resources and memory resources, being configured to receive and respond to requests from other computing devices. In some embodiments, the client device 110 may transmit messages through a firewall port to the application server 130. In some other embodiments, there may be no firewall between the client device 110 and the application server 130. In some embodiments, the remote server 150 may be configured such that the remote server 150 and the application server 130 may be on the same "side" of a firewall.

The client device 110 may, in some embodiments, comprise an endpoint including one or more of any of the following: mobile devices (e.g., smartphones, tablets, laptops, wearables, gaming devices, navigation devices, cameras, etc.), computers (e.g., laptops, desktops, etc.), IoT (Internet of Things) devices (e.g., vehicles, appliances, smart devices, connected devices, buildings including homes, etc.), EoT (Enterprise of Things) devices (i.e., IOT devices in an enterprise) and any other nodes or combination thereof. Vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combination of any of the foregoing, whether currently existing or after arising. The client device 110 may include at least one processor 112, memory 114 and a communication system 124. The communication system 124 may include subsystems for wired or wireless data communication and wired or wireless voice communication. In some embodiments, the communication system 124 may include subsystems for cellular data and voice connectivity via a cellular system. The cellular system may include a system operating in accordance with one or more of a variety of cellular voice and data protocols for connectivity and communication, including 5G, 4G, and 3G systems. The communication system 124 may further include a subsystem for wireless local area network (WLAN) connectivity with an access point, which may be operating in accordance with IEEE 802.11 protocol, for example. The communication system 124 may provide the client device 110 with other wired or wireless connections for accessing the network 180.

The client device 110 may include an output interface 126, such as a display, and at least one input interface 128. The at least one input interface 128 may be coupled to a touch sensitive overlay on a display for detecting touch-based input, for example. Other examples of input interface devices may include keyboards, keypads, touchpads, mice, keyboard with touch-sensitive surface, or various buttons. In some embodiments, the input interface 128 may include a port or other communication path for receiving input via an external peripheral device, such as a mouse, keyboard, wand, pen, etc.

The memory 114 may include volatile and non-volatile memory. At least a part of the memory 114 may store processor-readable instructions that, when executed by the processor 112, cause the processor 112 to carry out some of the operations described herein. The processor-readable instructions stored in memory 114 may include an operating system 116 which may provide basic device functions and may create a run-time environment within which other software may be executed. The memory 114 may also store a plurality of applications 118, where the term "application" refers to a set of program-executable instructions that configure or adapt the processor 112 to carry out a particular algorithm or set of steps or operations. Example applications 118 may include a messaging application, a word processing application, a calendar, a calculator, a music library, a social media application, or other such applications.

In some embodiments, the applications 118 stored in the memory 114 may also include an application module which includes instructions for interacting with application servers, such as the application server 130 illustrated in FIG. 1. In some embodiments, the application server 130 may be a web server. An application module may, for example, take the form of a web browser 120. A browser enhancement module 122 may, for example, be provided on the client device 110 as a plug-in to the web browser 120. The browser enhancement module 122 may extend functionality of the web browser 120.

The client device 110 may include other components apart from those identified in FIG. 1 including, for example, a power source or an interface for connecting to a power source.

Figure 2:
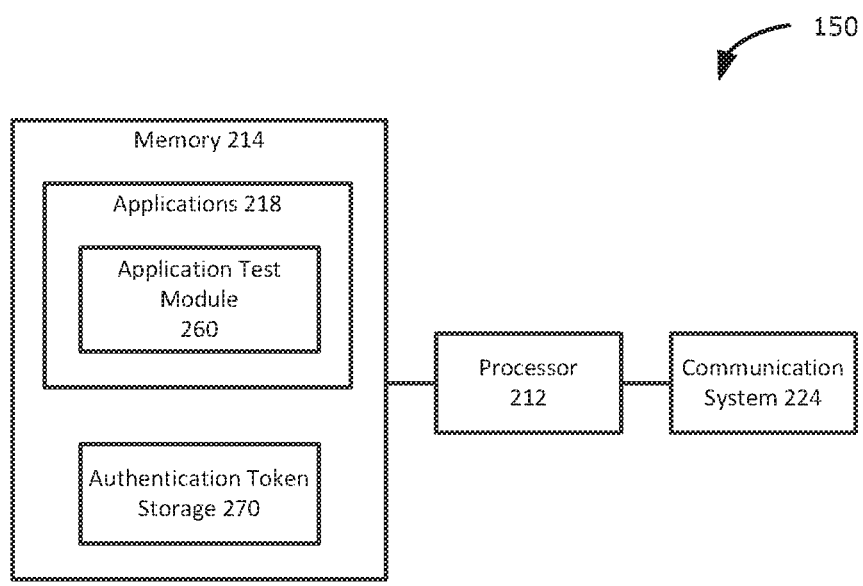
FIG. 2 illustrates a remote server of FIG. 1, in accordance with an embodiment of the present application.

Reference is now made to FIG. 2, which illustrates a remote server 150 of FIG. 1, in accordance with an embodiment of the present application. The remote server 150 may include at least one processor 212. The processor 212 may be coupled to a memory 214 and a communication system 224. The processor 212 may be coupled to other subsystems not illustrated in FIG. 2, such as an input interface or an output interface.

The communication system 224 may include subsystems for wired or wireless data communication. The communication system 224 may allow the remote server 150 to send and receive data. For example, the communication system 224 may allow electronic messages to be sent and received over the network 180 (FIG. 1). Among other things, the communication system 224 may be used by the remote server 150 for communication with one or more client device 110 (FIG. 1) or one or more application server 130 (FIG. 1).

The memory 214 may include volatile and non-volatile memory. At least part of the memory 214 may store processor-readable instructions, which may be referred to as applications 218 that, when executed by the processor 212, cause the processor 212 to carry out some of the operations described herein. The applications 218 stored in the memory 214 may include, for example, an application test module 260. In some embodiments, the application test module 260 may include applications such as web application test tools or suites to scan web applications executing on an application server 130 (FIG. 1) and identify security vulnerabilities, or other unexpected or undesirable behaviour. Non-limiting examples of web application test tools or penetration test tools include Burp Suite, Skipfish, OWASP Zed Attack Proxy, etc. In some examples, web application test tools may be configured to accept credential information, such as usernames, passwords, biometric data, gesture data, location data, or authentication uniform resource locators (URLs) such that the web application test tools may perform in-depth scans of web applications requiring authentication credential information prior to access being granted.

The memory 214 may also include an authentication token storage 270. The authentication token storage 270 may be a portion of the memory 214 setup for storing authentication tokens related to various protected applications. In some embodiments, the authentication token storage 270 may be a database. As will be described herein, the authentication token storage 270 may store session IDs or cookies, when session ID-based authentication methods are used, or OAuth bearer tokens, when signature-based authentication methods are used. In some embodiments, when the remote server 150 may be directed to access a protected application executing on an application server 130, a directive may be provided to the remote server 150 and may include a reference to an authentication token associated with the protected application. For example, when the remote server 150 may be directed to access a web application executing on the application server 130, the directive received from a client device 110 may include a pointer or reference to a particular authentication token (e.g., session ID, cookie or OAuth bearer token) that may be stored at the authentication token storage 270. Thus, the authentication token may be passed to an application programming interface of a web application test suite, such that the remote server may emulate the client device 110 in interactions with the application server 130.

The remote server 150 may include other components apart from those identified in FIG. 2, including, for example, a power source or an interface for connecting to a power source.

Figure 3:
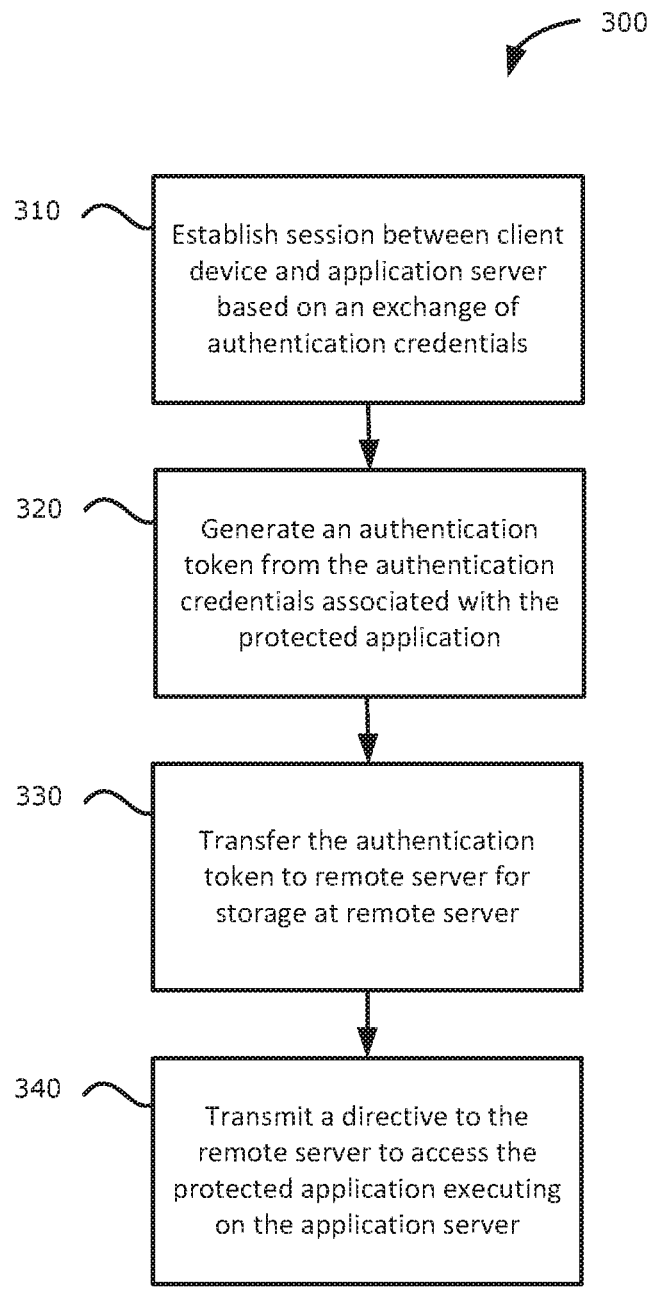
FIG. 3 illustrates a method of delegating authenticated access, in accordance with an embodiment of the present application.

Reference is now made to FIG. 3, which illustrates, in flowchart form, a method 300 of accessing a protected application executing on an application server 130 (FIG. 1). For example, the method 300 may include delegating, to a remote server 150 (FIG. 1), authenticated access to a protected application executing on an application server 130, in accordance with an embodiment of the present application. The method 300 may include operations that may be carried out by the client device 110 (FIG. 1). The method 300 may be implemented, at least in part, through processor-executable instructions stored for example at the browser enhancement module 122 (FIG. 1). In some embodiments, one or more of the operations may be implemented via processor-executable instructions in other applications 118 or in the operating system 116.

At operation 310, a session may be established between a client device 110 and an application server 130 based on an exchange of authentication credential information. For example, the client device 110 may exchange authentication credential information with the application server 130. Upon successful exchange of authentication credential information, the session between the client device 110 and the application server 130 may be established.

In some examples, the client device 110 may receive a web application address in the web browser 120 (FIG. 1) and transmit the web application address to the application server 130. The client device 100 may receive a response from the application server 130 and providing a user interface for accepting authentication credential information, such as usernames, passwords, biometric data, gesture data, location data, or other identifiers. Accordingly, the client device 110 may transmit authentication credential information in the form of credentials, such as usernames, passwords, biometric data, gesture data, location information, or other identifiers, to the application server 130.

As will be described with greater detail in the description that follows, when the application server 130 validates the credential information, the client device 110 may receive returned authentication credential information from the application server 130. Examples of returned authentication credential information may include a session ID when session ID-based authentication is used. In other examples, returned authentication credential information may include a OAuth bearer token when signature-based authentication is used. The returned authentication credential information may, in some embodiments, be derived from credential information based on the client device 110 interaction with the application server 130. Accordingly, in some examples, operations involved in establishing the session may include:

(1) the application server 130 assigning a session ID or OAuth bearer token, among others, to the client device 110; and (2) the application server 130 transmitting the session ID or OAuth bearer token to the client device 110. In some examples, the session ID or OAuth bearer token may be part of a cookie or an authentication header.

At operation 320, the client device 110 may generate an authentication token from the authentication credential information associated with the protected application. For example, if a session ID-based authentication scheme is used, the client device 110 may generate a cookie with the session ID that was provided by the application server 130. In another example, if signature-based authentication scheme is employed, the client device 110 may generate an authentication header based on or including the OAuth bearer token that was provided by the application server 130. Accordingly, at operation 320, the client device 110 generates an authentication token, where the authentication token may (a) be associated with a protected application executing on the application server 130; and (b) be associated with user credential information that were previously exchanged between the client device 110 and the application server 130. In some embodiments, the client device 110 may generate a time-limited authentication token. For example, the time-limited authentication token may be associated with an expiry date/time (e.g., shelf life), and after the expiry date/time, the time-limited authentication token may no longer be accepted by the application server 130. In some embodiments, after the expiry date/time, the client device 110 may be configured to delete the authentication tokens stored on the client device 110.

In some embodiments, the client device 110 may generate an authentication token having a subset of the full permissions associated with authentication credential information. For example, once the client device 110 receives an OAuth bearer token from the application server 130, the client device 110 may create a permissions-limited token, where the permissions-limited token may impose reduced level of access to a protected application as compared to a "non-permissions-limited" token. For example, the permissions-limited token be associated with a protected application and may disable, or mask using an additional authentication wall, a subset of functionality that otherwise would be available with a non-permissions-limited token.

At operation 330, the client device 110 may transfer the authentication token to the remote server 150 for storage at the remote server 150. In some embodiments, the authentication token may be transferred to the remote server 150 and, subsequently, the remote server 150 may execute processor-executable instructions for interacting with the application server 130. As will be apparent in the description that follows, the authentication token may be utilized by another computing device separate from the client device 110, such as the remote server 150, for interacting with the application server 130. Accordingly, by transferring the authentication token to the remote server 150 for storage at the remote server 150, the client device 110 may be conducting operations for delegating, to the remote server 150, authenticated access to a protected application executing on the application server 130.

At operation 340, the client device 110 may transmit a directive to the remote server 150 to access the protected application executing on the application server 130. In some embodiments, the directive may be a sequence of instructions or inputs, and the sequence of instructions or inputs may be intended to be used by the remote server 150 for interacting with the protected application executing on the application server 130. For example, the directive may include a listing of types of security scans that may be available for execution by the remote server 150 (e.g., on behalf of the client device 110) when interacting with an application executing on the application server 130.

In some embodiments, the directive may include an identifier associated with the authentication token for accessing the protected application. For example, the directive may include an identifier, such as the name "John", and the identifier "John" may be associated with the authentication token for accessing the protected application. Accordingly, the authentication token associated with the identifier "John" may be retrieved and used in combination with instructions or inputs by the remote server 150 for interacting with the application executing on the application server 130.

In another example, the directive may include a reference to the authentication token associated with a protected application executing on the application server 130. For example, an authentication token may have been derived from authentication credential information exchanged between the client device 110 and the application server 130 in association with the protected application. The authentication token may be generated based on validation of credential information at the application server 130 and may be generated based on returned credentials (e.g., session ID or OAuth bearer token) to the client device 110. The authentication token may be retrieved based on the reference in the directive and may enable the remote server 150 to interact with the protected application. That is, in some embodiments, the directive to access protected applications include instructions for conducting security penetration testing of the protected application by emulating, at the remote server 150, the client device interaction with the application server 130.

As an illustrating example, a directive transmitted by the client device 110 to the remote server 130 may include instructions for conducting penetration testing of a web application executing on the application server 130. The remote server 130 may incorporate the previously generated authentication token into messages/requests for sending to the application server 130, such that the remote server 130 may emulate client device 110 interactions with the application server 130. That is, the remote server 130 may conduct penetration testing of the web application that is executing on the application server 150. The remote server 130 may interact or perform testing scans of web application features that may be protected by an authentication wall.

As described, in some embodiments, the interactions between the client device 110 (or the remote server 150) and the application server 130 may utilize a session ID-based authentication scheme. With the session ID-based authentication scheme, an authentication record or session may be logged on both the client device 110 and the application server 130. The application server 130 may track active sessions using session IDs stored in a database. A cookie may be created on the client device 110, and the cookie may include a session identifier (e.g., session ID) for the active session.

Figure 4:
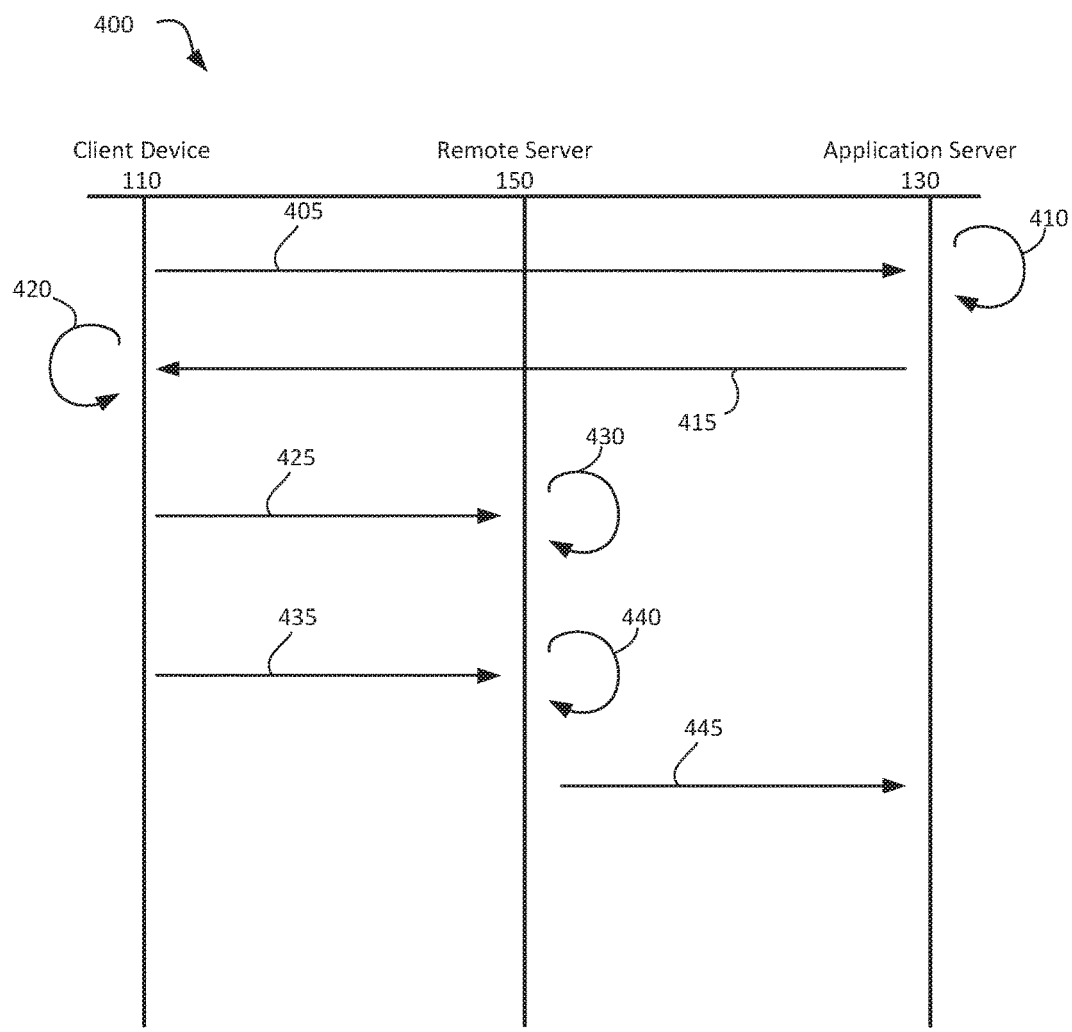
FIG. 4 illustrates a signal diagram diagrammatically illustrating signaling or messaging exchanges among the client device, the application server, and the remote server, in accordance with an embodiment of the present application.

To illustrate, reference is now made to FIG. 4, which is an example signal diagram 400 diagrammatically illustrating signaling or messaging exchanges among the client device 110, the application server 130, and the remote server 150, in accordance with an embodiment of the present application. In particular, the signal diagram 400 may be described with reference to an example client device 110 delegating, to the remote server 150, authenticated access to a protected application executing on the application server 130. For example, the client device 110 may be delegating penetration security testing to the remote server 150 of an online auction portal (e.g., protected web application) executing on the application server 130. In the present example, it may be desirable for the remote server 150 to be able to emulate the client device 110 and interact with the online auction portal, such that online auction portal provides transaction data as if the online auction portal is interacting with the client device 110 directly. For example, the remote server 150 may be configured with penetration testing tools, and the penetration testing tools may provide application programming interfaces for accepting instructions and for accepting authentication tokens for use during the penetration test of the target web application.

To establish a session, at operation 405, the client device 110 may transmit user credential information to the application server 130. For example, user credential information may include a username, a password, biometric data, gesture data, location data, or identifier that may be unique to a user of the client device 110 who may desire to interact with the protected application executing on the application server 130.

Once the application server 130 receives the credential information, at operation 410, the application server 130 may verify that the received credential information for the particular protected application matches credential information that may be stored in a database of the application server 130. Once the application server 130 verifies that the credential information is valid, a session having a session ID may be created and stored in a database at the application server 130.

At operation 415, the application server 130 may transmit the session ID to the client device 110. For example, the session ID may be a returned authentication credential. The session ID may be used to track that session between the client device 110 and the application server 130, which is associated with the verified credential information.

When the client device 110 receives the session ID, at operation 420, the client device 110 may generate a cookie that includes the received session ID (or other returned authentication credential information) and store the cookie at the web browser 120 (FIG. 1). Although operation 420 is described to include generating a cookie that includes the received session ID, in some embodiments, operation 420 may not generate a cookie and may simply store the session ID at the web browser in another format. Accordingly, based on the aforementioned operations, a session may be established between the client device 110 and the application server 130.

At operation 425, the client device 110 may transmit the generated cookie (e.g., authentication token) to the remote server 150 for storage at the remote server 150. By transmitting the generated cookie to the remote server 150, the client device 110 may be delegating authenticated access of a previously established session as between the client device 110 and the application server 130. In some embodiments, the remote server 150 may provide an application programming interface for accepting authentication tokens from the client device 110. In some embodiments, prior to transferring or transmitting the generated cookie to the remote server, the client device 110 may encrypt the generated cookie (e.g., authentication token).

In some embodiments, the browser enhancement module 122 (FIG. 1) may be configured to provide a user with an option to share generated cookies with the remote server 150. For example, prior to transferring the cookie (e.g., authentication token) to the remote server 150 for storage at the remote server 150, the client device 110 may receive an instruction from the user to transfer the cookie to the remote server 150. That is, cookie generated at the client device 110 may not be automatically transferred to the remote server 150. It may be advantageous to provide a user of the client device 110 with an executable option on whether to share generated cookies with the remote server 150. In some examples, the user of the client device 110 may be interested in delegating authenticated access to a select number of protected applications executing on the application server 130. Thus, it may be useful to provide the user of the client device 110 with options on what authentication access to delegate and what other authentication access to retain at the client device 110. For example, the user of the client device 110 may be comfortable sharing cookies that are associated with social media platforms with another computing device (e.g., remote server 150). However, the user of the client device 110 may not be comfortable sharing cookies that are associated with online banking platforms with another computing device.

At operation 430, the remote device 150 may store received cookies. In some embodiments, the received cookies may be categorized or stored such that when the remote device 150 receives a directive referencing the cookie, the cookie may be quickly retrieved for subsequent operations. In some embodiments, the received cookies may be catalogued according to which protected application the cookie may be associated with. For example, the remote device 150 may store multiple cookies that may be associated with a social media platform. Each of the multiple cookies associated with the social media platform may be associated with a different user of the computing device 110. Accordingly, cookies (e.g., authentication tokens) may be stored at the remote server 150 and may be associated with a particular protected application and with particular user credential information from which the cookie was derived.

At operation 435, the client device 110 may transmit a directive to the remote server 150 to access a particular protected application executing on the application server 130. That is, the client device 110 may transmit commands for instructing the remote server 150 to interact with the particular protected application.

In some embodiments, the directive may include a reference to a particular authentication token associated with the particular protected application. For example, the client device 110 may transmit commands to the remote server 150 for instructing the remote server 150 to access a social media platform using a cookie having a particular session ID.

Accordingly, at operation 440, the remote server 150 may retrieve or access the cookie from an authentication token storage 270 (FIG. 2) based on information (e.g., a reference to the particular authentication token or an identifier associated with the particular authentication token) included in the directive. For example, if the directive included a reference to a particular session ID, the remote server 150 may identify the previously stored cookie with that particular session ID and incorporate that particular cookie with each interaction/request when interacting with the social media platform executing on the application server 130.

In another example, the directive may include an identifier associated with the particular authentication token associated with the particular protected application. For example, the identifier may be a name "John" and may be associated with the particular authentication token. In this example, at operation 440, the remote server 150 may retrieve or access the particular authentication token from the authentication token storage 270 (FIG. 2) based on the identifier "John".

Further, the remote server 150 may parse the received directive and may provide, as an input via an API, the cookie to the penetration test tool for scanning the web application that is executing on the application server 130. Thus, at operation 445, the remote server 150 may interact with the application server 130 for authenticated access to the protected application. For example, if the remote server 150 is configured as a web application tester, the remote server 150 may be configured to execute the suite of penetration test tools, and may scan the targeted web application (e.g., social media platform) executing on the application server 130. Accordingly, the remote server may execute operations for conducting security penetration testing of the social media platform (e.g., web application) by emulating, at the remote server 150 while using the authentication token, interactions that a client device 110 may otherwise be conducting with the application server 130.

In another example, interactions between the client device 110 (or the remote server 150) and the application server 130 may utilize a signature-based authentication scheme. A signature-based authentication scheme may be stateless, and the application server 130 may not keep a record of established sessions nor which client devices 110 may have an active session with the application server 130. With signature-based authentication, each request or message sent from the client device 110 to the application server 130 may be accompanied by an OAuth bearer token, or an authentication header incorporating the OAuth bearer token, which the application server 130 may utilize to verify authenticity of the request. OAuth bearer tokens may be associated with particular protected applications, and such OAuth bearer tokens may form authentication headers that may be passed on to other applications via application programming interfaces. Although OAuth bearer tokens are discussed in the example that follows, any other types of tokens for signature-based authentication schemes may be used.

Using FIG. 4 to illustrate an example signature-based authentication scheme, at operation 405, the client device 110 may establish a session with the application server 130 and may transmit user credential information to the application server 130. As described herein, credential information may include usernames, passwords, biometric data, gesture data, location data, or other unique identifiers for a user of the client device 110.

Once the application server 130 receives the credential information, at operation 410, the application server 130 may verify that the received credential information for a particular protected application matches credential information that may be stored in a database of the application server 130. Once the application server 130 verifies that the credential information is valid, the application server 130 may generate or return an OAuth bearer token or a signed token.

At operation 415, the application server 130 may transmit the OAuth bearer token to the client device 110 and the client device may store the OAuth bearer token in memory 114 (FIG. 1). For example, the OAuth bearer token may (a) be associated with the particular protected application; and (b) be associated with user credential information that was exchanged between the client device 110 and the application server 130.

At operation 420, the client device 110 may store the OAuth bearer token in memory 114 (FIG. 1) or in the browser enhancement module 122 (FIG. 1) as part of an authentication header and relate that authentication header with a particular protected application.

At operation 425, the client device 110 may transmit the authentication header (e.g., authentication token) to the remote server 150 for storage at the remote server 150. By transmitting the authentication header to the remote server 150, the client device 110 may be delegating authenticated access of a previously established session as between the client device 110 and the application server 130.

In some embodiments, the client device 110 may generate a permissions-limited token or permissions-limited authentication header to impose a reduced level of access to a protected application as compared to a "non-permissions-limited" token or authentication header. Accordingly, the client device 110 may generate a permissions-limited authentication header and may pass that permissions-limited authentication header to the remote server 150, such that the remote server 150 may only access data or interact with the protected application that may be allowed by the permissions-limited authentication header.

In some embodiments, the browser enhancement module 122 (FIG. 1) of the client device 110 may be configured to iteratively or automatically inspect transaction data exchanged between the client device 110 and the application server 130 and may automatically extract authentication credential information for generating authentication tokens (e.g., cookies and/or authentication headers). The browser enhancement module 122 may be a web browser extension/add-on/plug-in, and may be configured to automatically share the generated authentication tokens with the remote server 150 or other computing devices. In some examples, the browser enhancement module 122 may share the generated authentication tokens with the remote server 150 only after receiving an instruction from a user of the client device 110 to transfer authentication tokens to the remote server 150. That is, the client device 110 may restrict when and what authentication tokens are shared to other computing devices. For example, the web enhancement module 122 (FIG. 1) may enable a user interface element in an interface of the web browser 120 (FIG. 1) and the user may select or "click" the user interface element for transferring one or more authentication tokens to other computing devices.

At operation 430, the remote device 150 may store the received authentication headers in memory. For example, the remote device 150 may store the received authentication headers in the authentication token storage 270 (FIG. 2). In some embodiments, the authentication token storage 270 may store a plurality of authentication headers received from the client device 110. Each of the authentication headers may be associated with a particular protected application and with particular user credential information from which a respective authentication header was derived.

At operation 435, the client device 110 may transmit a directive to the remote server 150 to access a protected application executing on the application server 130. The client device 110 may provide instructions for delegating operations or intended interactions to the remote server 150, such that the client device 110 may offload computing resources onto the remote server 150.

At operation 440, the remote server 150 may parse the received directive and may retrieve a stored authentication header based on that received directive. The authentication header may be used for executing, for example, by the remote server 150 for penetration testing of a protected web application executing on the application server 130.

Thus, at operation 445, the remote server 150 may send web requests or messages to the application server 130 for interacting with a protected application executing on the application server 130. For example, the remote server 150 may be configured to conduct tests or scans of the web application executing on the application server 130. As the remote server 150 may be sending web requests or messages using the retrieved authentication header (e.g., authentication header retrieved at operation 440), the remote server 150 may be running penetration test tools as if the client device 110 were running the penetration test tools. Because the remote server 150 may be sending web requests or messages based on the retrieved authentication header, in effect, the remote server 150 may be interacting with the web application on behalf of the client device 110.

As described herein, examples of authentication tokens transferred to the remote server 150 for storage at the remote server 150 include cookies (including session IDs) or authentication headers (including, for example, OAuth bearer tokens). However, it may not be desirable to transfer authentication token to the remote server 150 (or other computing devices) to delegate authenticated access to protected applications for an indefinite duration of time. Accordingly, in some embodiments, the client device 110 may generate a time-limited authentication token. For example, with a signature-based authentication scheme, an authentication header, that may include an OAuth bearer token, may be created with an expiration time/date and stored at the client device 110 or the remote server 150. Upon the expiration time/date, the client device 110 or the remote server 150 may recognize that the authentication header is no longer valid and discard that authentication header. In some other embodiments, the authentication header may be associated with the expiration time/date, and when requests having the authentication header are received at the application server 130, the application server 130 may prevent authenticated access to a protected application.

Although embodiments described herein describe implementations that include generating cookies with session IDs or generating authentication headers that may pass OAuth bearer tokens to a remote server, other implementations of authentication mechanisms may be used with embodiments of the present application. Other examples authentication mechanisms that may use tokens or HTTP headers, such as HTTP Origin-Bound Authentication (HOBA) or HTTP Digest Access Authentication schemes, may be implemented with embodiments of the present application. Further, proprietary authentication schemes that may use tokens or HTTP headers may also be implemented with embodiments of the present application.

Figure 5:
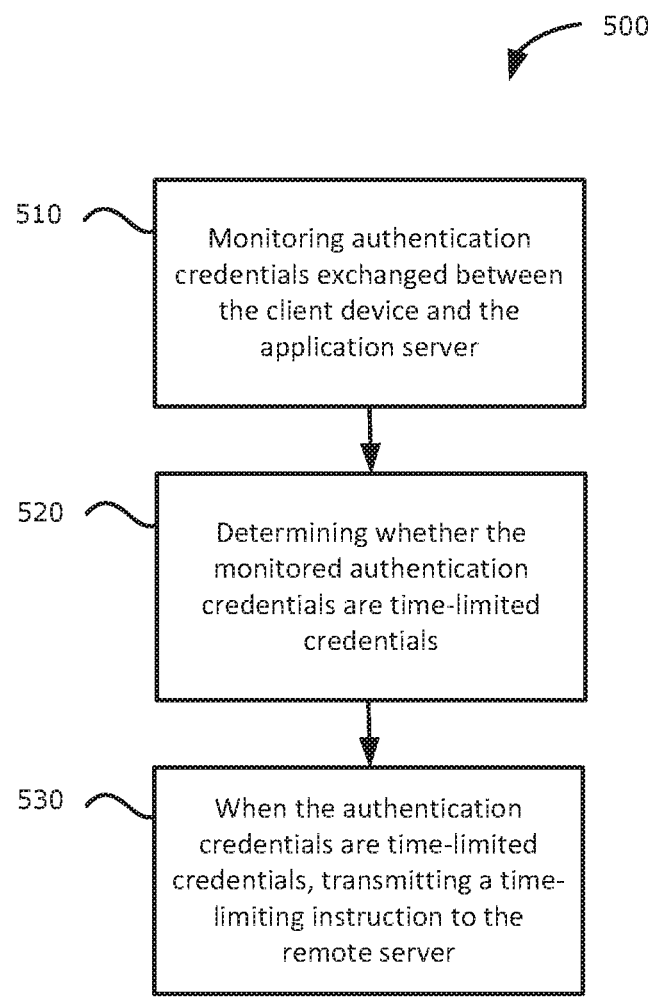
FIG. 5 illustrates a method of deleting authentication tokens, in accordance with an embodiment of the present application.

Reference is now made to FIG. 5, which illustrates, in flowchart form, a method 500 of deleting time-limited authentication tokens associated with protected applications, in accordance with an embodiment of the present application. The method 500 may include operations that may be carried out by the client device 110 (FIG. 1). The method 500 may be implemented, at least in part, through processor-executable instructions stored for example at the browser enhancement module 122. In some embodiments, one or more of the operations may be implemented via processor-executable instructions in other applications 118 or in the operating system 116.

At operation 510, the client device 110 may monitor transaction data exchanged between the client device 110 and the application server 130. For example, in some embodiments, the browser enhancement module 122 (FIG. 1) may be a web browser plug-in, and the browser enhancement module 122 may include instructions for continually inspecting authentication credential information being exchanged between the client device 110 and an application executing on the application server 130.

At operation 520, the client device 110 may determine whether the monitored authentication credential information is time-limited. For example, a user of the client device 110 may provide credential information to a protected application executing on the application server 130. In addition, the user may also provide an expiry date/time in association with the credential information. In some other embodiments, the client device 110 or the application device 130 may be configured to impose an expiry date/time in association with the credential information.

At operation 530, when the authentication credential information is time-limited, the client device 110 may transmit a time-limiting instruction to the remote server 150 to instruct the remote server 150 to delete an authentication token upon expiry of the limited time. For example, the time-limiting instruction may be an instruction for the remote server 150 to determine when the limited time has been reached, and to delete (or render invalid) the authentication token once the limited time has been reached. That is, the time-limiting instruction may delegate, to the remote server 150, a task of determining when an authentication token (e.g., cookie or authentication session header) is no longer valid.

In some embodiments, the time-limiting instructions may be stored in a database storage at the remote server 150. For example, the time-limiting instructions may be organized or catalogued in a time-order.

As described herein, in some embodiments, the remote server 150 may be configured to execute security penetration test tools or suites. Accordingly, upon completion of executing the security penetration test tools or suites, in some embodiments, the remote server 150 may transmit results or test logs from the penetration testing to the client device 110 or any other computing device.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of accessing a protected application executing on an application server, the method comprising:

transmitting, to the application server, user credential information to establish a session at the application server for accessing the protected application;

receiving, from the application server, a returned authentication credential, wherein the returned authentication credential is based on verification by the protected application of the transmitted user credential information;

generating an authentication token based on the returned authentication credential, wherein the authentication token delegates, to a remote server, authenticated access to the established session with the application server, wherein the authentication token includes a session ID stored in a cookie, wherein prior to transferring the cookie associated with the protected application to the remote server for Session ID-based authentication between the client device and the application server, encrypting the cookie for accessing the protected application;

transferring, to the remote server, the authentication token for storage at the remote server; and transmitting a directive to the remote server to access the protected application executing on the application server, wherein the directive includes an identifier associated with the authentication token for accessing the protected application.

2. The method of claim 1, wherein the directive to access the protected application includes instructions for conducting security penetration testing of the protected application by emulating, at the remote server, the client device interaction with the application server.

3. The method of claim 1, further comprising:

monitoring the returned authentication credential exchanged between the client device and the application server;

determining whether the returned authentication credential is time-limited; and when the returned authentication credential is time-limited, transmitting a time-limiting instruction to the remote server to delete the authentication token upon expiry of the limited time.

4. The method of claim 1, wherein generating the authentication token includes generating a time-limited authentication token.

5. The method of claim 1, wherein the protected application comprises a web application.

6. The method of claim 1, further comprising: prior to transferring the authentication token to the remote server for storage at the remote server, receiving an instruction provided by a user to transfer the authentication token to the remote server.

7. A client device accessing a protected application executing on an application server, the client device comprising:

a processor;

a communication system coupled to the processor for communicating over a network with a remote server and the application server; and a memory coupled to the processor and storing processor-readable instructions that, when executed, cause the processor to:

transmit, to the application server, user credential information to establish a session at the application server for accessing the protected application;

receiving, from the application server, a returned authentication credential, wherein the returned authentication credential is based on verification by the protected application of the transmitted user credential information;

generate an authentication token based on the returned authentication credential, wherein the authentication token delegates, to the remote server, authenticated access to the established session with the application server, wherein the authentication token includes a session ID stored in a cookie, wherein prior to transferring the cookie associated with the protected application to the remote server for Session ID-based authentication between the client device and the application server, encrypting the cookie for accessing the protected application;

transfer, to the remote server, the authentication token for storage at the remote server; and transmit a directive to the remote server to access the protected application executing on the application server, wherein the directive includes an identifier associated with the authentication token for accessing the protected application.

8. The client device of claim 7, wherein the directive to access the protected application includes instructions for conducting security penetration testing of the protected application by emulating, at the remote server, the client device interaction with the application server.

9. The client device of claim 7, wherein the processor-readable instructions, when executed, further cause the processor to:

monitor the returned authentication credential exchanged between the client device and the application server;

determine whether the returned authentication credential is time-limited; and when the returned authentication credential is time-limited, transmit a time-limiting instruction to the remote server to delete the authentication token upon expiry of the limited time.

10. The client device of claim 7, wherein to generate the authentication token includes generating a time-limited authentication token.

11. The client device of claim 7, wherein the protected application comprises a web application.

12. The client device of claim 7, further comprising: prior to transferring the authentication token to the remote server for storage at the remote server, the processor-readable instructions, when executed, further cause the processor to receive an instruction provided by a user to transfer the authentication token to the remote server.

13. A non-transitory computer-readable storage medium comprising processor-executable instructions which, when executed, configure a processor to:

transmit, to an application server, user credential information to establish a session at the application server for accessing the protected application;

receiving, from the application server, a returned authentication credential, wherein the returned authentication credential is based on verification by the protected application of the transmitted user credential information;

generate an authentication token based on the returned authentication credential, wherein the authentication token delegates, to a remote server, authenticated access to the established session with the application server, wherein the authentication token includes a session ID stored in a cookie, wherein prior to transferring the cookie associated with the protected application to the remote server for Session ID-based authentication between the client device and the application server, encrypting the cookie for accessing the protected application;

transfer, to the remote server, the authentication token for storage at the remote server; and transmit a directive to the remote server to access the protected application executing on the application server, wherein the directive includes an identifier associated with the authentication token for accessing the protected application.

14. The non-transitory computer-readable storage medium of claim 13, further comprising processor-executable instructions which, when executed, configure the processor to:
- monitor the returned authentication credential exchanged between the client device and the application server;
- determine whether the monitored returned authentication credential is time-limited; and
- when the returned authentication credential is time-limited, transmit a time-limiting instruction to the remote server to instruct the remote server to delete the authentication token upon expiry of the limited time.

15. The non-transitory computer-readable storage medium of claim 13, wherein the directive to access the protected application includes instructions for conducting security penetration testing of the protected application by emulating, at the remote server, the client device interaction with the application server.

16. The non-transitory computer-readable storage medium of claim 13, wherein the instructions, when executed, cause the processor to generate the authentication token by generating a time-limited authentication token.

17. The non-transitory computer-readable storage medium of claim 13, wherein the protected application comprises a web application.

18. The non-transitory computer-readable storage medium of claim 13, further comprising processor-executable instructions which, when executed, configure the processor to: prior to transferring the authentication token to the remote server for storage at the remote server, receiving an instruction provided by a user to transfer the authentication token to the remote server.

* * * * *